United States Patent [19]

Baier et al.

[11] Patent Number: 5,524,739
[45] Date of Patent: Jun. 11, 1996

[54] TRANSMISSION HAVING A CLUTCH WITH AN ARRANGEMENT FOR FASTENING THE CLUTCH TO THE CRANKSHAFT AND A METHOD OF MAKING SAME

[75] Inventors: Wolfgang Baier, Obbach; Reinhart Deppert, Gochsheim; Jens Schneider, Schweinfurt; Hilmar Göbel, Grafenrheinfeld; Andreas Gebauer, Schweinfurt; Alfred Eusemann, Bergrheinfeld; Heiko Schulz-Andres, Poppenhausen, all of Germany

[73] Assignee: Fichtel & Sachs AG, Schweinfurt, Germany

[21] Appl. No.: 217,600

[22] Filed: Mar. 24, 1994

[30] Foreign Application Priority Data

Mar. 26, 1993 [DE] Germany ............. 43 09 873.8

[51] Int. Cl.[6] ............. B60K 17/02; F16D 13/58
[52] U.S. Cl. ............. 192/70.16; 74/572; 403/337
[58] Field of Search ............. 192/70.16; 74/572; 29/525; 403/337

[56] References Cited

U.S. PATENT DOCUMENTS

| Re. 22,485 | 5/1944 | Otto | 403/253 |
|---|---|---|---|
| 837,767 | 12/1906 | Aims | 403/337 X |
| 3,128,639 | 4/1964 | Hein et al. | 74/572 |
| 3,635,320 | 1/1972 | Capanna . | |
| 3,936,926 | 2/1976 | Hornschuch | 29/525 |
| 3,937,103 | 2/1976 | Kleinhans | 74/572 |
| 4,172,678 | 10/1979 | Schonwald et al. . | |
| 4,262,552 | 4/1981 | Honda | 74/572 |
| 4,346,624 | 8/1982 | Nagasaki et al. | 74/572 X |
| 4,668,116 | 5/1987 | Ito . | |
| 4,915,536 | 4/1990 | Bear . | |
| 5,191,810 | 3/1993 | Craft et al. | 403/337 X |
| 5,279,183 | 1/1994 | Förster et al. | 74/572 |

FOREIGN PATENT DOCUMENTS

| 0118918 | 9/1984 | European Pat. Off. . |
|---|---|---|
| 2689192 | 10/1993 | France . |
| 3315232 | 11/1983 | Germany . |
| 4013298 | 10/1991 | Germany . |
| 4117571 | 12/1991 | Germany . |
| 58-91925 | 6/1983 | Japan . |
| 1412076 | 10/1975 | United Kingdom . |
| 2127938 | 4/1984 | United Kingdom . |
| 2156937 | 10/1985 | United Kingdom . |
| 2236162 | 3/1991 | United Kingdom . |
| 2236561 | 4/1991 | United Kingdom . |
| 2243666 | 11/1991 | United Kingdom . |
| 2269429 | 2/1994 | United Kingdom . |

Primary Examiner—Charles A. Marmor
Attorney, Agent, or Firm—Nils H. Ljungman & Associates

[57] ABSTRACT

A system of fastening a flywheel on an output end of a crankshaft of an internal combustion engine, the flywheel being combined into a single component with a clutch plate unit and a clutch disc. The fastening can be achieved with essentially axial joint surfaces on the output end on one hand, and on the flywheel on the other hand, wherein the joint surfaces are designed as tapered or cylindrical surfaces which are self-locking in the axial direction.

12 Claims, 4 Drawing Sheets

TRANSMISSION HAVING A CLUTCH WITH AN ARRANGEMENT FOR FASTENING THE CLUTCH TO THE CRANKSHAFT AND A METHOD OF MAKING SAME

BACKGROUND OF THE INVENTION

1. Field of the Invention

This invention generally relates to a device for fastening a flywheel, to the output end of the crankshaft of an internal combustion engine, the flywheel being combined into a single component with a clutch pressure plate unit and a clutch disc.

2. Background Information

Conventional friction clutches of motor vehicles generally can have a one-piece or two-piece flywheel, on which a pressure plate unit can be fastened, usually in a detachable manner, by means of bolts or screws. The pressure plate unit can have an axially movable contact plate which can be guided in a non-rotating, but axially movable, manner on a clutch housing boiled to the flywheel. A prestress can be applied to the pressure plate unit preferably by a clutch main spring, which main spring can typically be a membrane spring, thereby biasing the pressure plate preferably towards the flywheel. The application plate or pressure plate and the flywheel can form friction surfaces for a clutch disc located between them, the hub of which clutch disc can be sealed so that it essentially does not rotate but can move axially on an input shaft of a transmission. The input shaft of a transmission is typically downstream in the drive train of the motor vehicle. On the other side of the flywheel, the flywheel can be bolted to an end flange of the crankshaft of the internal combustion engine by means of a number of bolts located around the axis of rotation of the crankshaft.

On conventional friction clutches, the clutch disc and the membrane spring, viewed in the axial direction, can cover the bolts which can hold the flywheel to the end flange of the crankshaft. During the assembly of the friction clutch, therefore, the flywheel typically must first be bolted to the end flange of the crankshaft, before the clutch disc can be installed, and then the pressure plate unit can be bolted to the flywheel. This assembly process is not only time-consuming, but also can have the disadvantage that the friction clutch as a whole cannot be inspected before assembly, i.e. when it includes the clutch disc and the flywheel, to make certain that the clutch unit complies with specifications.

DE-A-41 17 571 discloses both a clutch disc and a membrane spring with holes which are axially aligned with the bolts on the end flange of the crankshaft for fastening the flywheel. In this manner, the pressure plate unit can be assembled with the clutch disc and the flywheel preferably into a single component (modular clutch), even before they are mounted on the crankshaft. The fastening bolts can then preferably be tightened through the holes in the clutch disc and the membrane spring into the end flange of the crankshaft.

DE-A-33 15 232 teaches that a modular clutch consisting of a flywheel, pressure plate unit and clutch disc, on which the clutch housing can be crimped around the flywheel, i.e. the clutch housing is preferably not detachably connected to the flywheel, can be bolted by means of a central bolt onto the output end of the crankshaft. The output end of the crankshaft can have a centric end opening preferably with an internal thread, into which the internal central bolt is bolted. The central bolt can have a radially-projecting flange which can brace the flywheel against the axial end surface of the output end of the crankshaft. The central bolt can be designed as a hollow bolt and also can have a pilot bearing. The pilot bearing can radially guide the engine-side end of the transmission input shaft, which input shaft can extend through the hub of the clutch disc. The torque which can be transmitted via the radial flange of the central bolt, however, can be comparatively low, since only limited starting torques can be achieved for the central bolt.

To fasten the flywheel, DE-A-40 13 298 discloses a modular clutch which can have the facing axial surfaces of an end flange of the crankshaft and of the flywheel equipped with radial gear teeth, (e.g. serration). The flywheel can, in turn, be axially fixed to the output end of the crankshaft by means of a central bolt, which central bolt also contains the pilot bearing of the transmission input shaft. In this case, the central bolt performs essentially the axial fixing function only, while the torque can be transmitted from the crankshaft to the flywheel by means of the radial gear teeth.. The central bolt which can be screwed into a threaded central opening on the output end of the crankshaft can have key slots in the vicinity of the pilot bearing. A screwdriver can be inserted into the key slots through the hub of the clutch disc, to tighten the central bolt to the crankshaft.

Finally, in the book entitled "Die Motoren der Personenkraftwagen" ["The Engines of Passenger Cars"], by K. Wiecking and R. Gebauer, Verlag Chr. Belser, Stuttgart, 1952, Page 314, FIG. 341, it is disclosed that the flywheel of a conventional friction clutch can be fastened to the output end of the crankshaft of the internal combustion engine, by means of a cone-interference fit connection. The output end has an external cone which can taper toward the clutch disc,. onto which clutch disc the flywheel can be placed, by means of an internal cone on the hub of the flywheel. The output end of the crankshaft can end in a threaded pin, onto which threaded pin a nut which can secure the flywheel can be screwed. However, the design of the known arrangements does not make it possible to install the pressure plate unit with the clutch disc and the flywheel as a single component.

OBJECT OF THE INVENTION

The object of the present invention is to create a system which can make it possible, using simple means, to fasten a clutch component preferably comprising the pressure plate unit, the clutch disc and the flywheel, in a single working process and without any radial play, to the output end of the crankshaft. It must thereby be possible to perform the assembly operations in a very simple manner.

SUMMARY OF THE INVENTION

The invention is based on a system for fastening a flywheel, which flywheel can be combined with a clutch pressure plate unit and a clutch disc into a single component, preferably onto the output end of a crankshaft of an internal combustion engine, with joint surfaces which can be oriented essentially axially on the output end on one hand, and essentially axially on the flywheel on the other hand. The improvement claimed by the invention is essentially that the joint surfaces of the output end and the flywheel unit can be preferably designed as taper surfaces which can be self-locking or irreversible in the axial direction. During the assembly of the clutch component, essentially all that is necessary is to axially press the flywheel preferably onto the output end of the crankshaft. The taper surfaces not only transmit the torque, but can also secure the clutch component to the crankshaft. The flywheel can preferably be fixed to the output end in the axial direction, essentially by means of its taper surface, but there can also be additional axial securing elements if necessary. But on account of the axially self-locking or irreversible characteristics of the taper surfaces, there can essentially be no need to apply any force-fit, or only very insignificant forces to achieve an interference fit, preferably to guarantee the torque transmission capability of the taper surfaces during operation. One of the additional securing elements can be a central bolt, for example, which central bolt can be used during assembly to axially press the flywheel onto the crankshaft. Preferably, the central bolt can be axially accessible through the hub of the clutch disc. The central bolt can also be designed so that it can be extracted preferably through the hub of the clutch disc, if the axial securing is performed exclusively by the axial self-locking properties of the taper surfaces.

The flywheel can have a central opening, the inside jacket of which flywheel can form the taper surface, and in which taper surface the output end of the crankshaft can be engaged preferably with its corresponding taper surface. In a preferred embodiment, which embodiment shifts the taper surfaces into the output end of the crankshaft, and thus closer to the output-side crankshaft bearing, the flywheel can have a conical extension preferably with a joint surface which can taper conically toward the crankshaft, and can be engaged with the conical extension in an opening in the face of the output end of the crankshaft, which form a corresponding conical joint surface. This variant embodiment also can have the advantage that the region of the flywheel can lie axially outside the output end of the crankshaft, and can form or hold a pilot bearing preferably for a transmission input shaft. The conical extension can be appropriately provided with a continuous, central, axial hole, while the opening in the face of the output shaft can make a transition preferably into a central threaded hole for a clamping bolt, which clamping bolt can be inserted through the hole of the conical extension. The clamping bolt can also be used exclusively as an assembly tool, if it can be introduced and extracted through the hub of the clutch disc.

In one preferred configuration, the taper surfaces can be connected to one another preferably by means of adhesive during the assembly. The adhesive connection not only forms a type of seal, by means of which seal the frictional corrosion on the taper surfaces can essentially be prevented, but also can increase the torque which can be transmitted by the taper surfaces. It can also improve the axial self-locking properties of the taper surfaces. Since the adhesive can harden only after assembly, it can act as a lubricant during the assembly process and can reduce the axial pressing forces required for pressing the parts together.

During disassembly, the flywheel can be pulled off the crankshaft, preferably by means of suitable extraction tools. To facilitate this extraction, at least one of the taper surfaces can include at least one ring-shaped groove, which ring-shaped groove can be connected preferably by means of a passage to a pressure medium connection. Hydraulic fluid or a similar substance can be injected preferably by means of the central pressure medium connection into the ring-shaped groove, whereupon the radial press fitting can be expanded and loosened.

To facilitate manufacture, the taper surfaces can appropriately have an essentially circular cross section. But suitable taper surfaces can also include those which have a polygon profile, or other suitable profile in axial cross section, which profile can increase the torque transmission capability of the taper surfaces.

According to the aspects of the present invention described above, the taper surfaces can essentially guarantee that there can be no radial play and that the interference fit can be secured axially. According to an additional aspect of the invention which can also make it possible to assemble the clutch component in a simple manner, preferably on the output end of the crankshaft, the flywheel can be secured axially on the crankshaft, and a significant portion of the torque transmission capability of the flywheel-crankshaft connection can be achieved because the flywheel can be connected to the output end preferably by means of adhesive which can be applied to the essentially axial joint surfaces, and/or to radial joint surfaces of the flywheel and of the output end of the crankshaft. The essentially axial joint surfaces thereby can accomplish the radial centering of the flywheel on the output end of the crankshaft. In order that the radial joint surfaces, preferably of the flywheel and the output end of the crankshaft, can also contribute to the adhesive connection, the axial joint surfaces can therefore preferably be designed as substantially cylindrical surfaces. The cylindrical joint surfaces can preferably be sized for a transition fit, or for an interference fit, so that they can also be used with an adhesive connection for the transmission of torque. Here, too, the adhesive can act as a lubricant during the assembly, and then can act as a sealant for the fitting surfaces, preferably to prevent frictional corrosion.

According to an additional aspect of the invention, which can also essentially eliminate radial play preferably during the transmission of torque between the crankshaft and the flywheel of the clutch component, while simultaneously maintaining ease of assembly, the present invention teaches that pins can be inserted preferably in the flywheel, and in the output end, in numerous holes. These holes can preferably be distributed around the axis of rotation of the crankshaft, in pairs which can be oriented axially in relation to one another, to essentially eliminate any play during the transmission of torque. The pins can also be used to axially fix the flywheel to the crankshaft, but there can also be additional axial securing means, e.g. a central fastening bolt, which can be in turn accessible through the hub of the clutch disc. In an alternative embodiment, these holes can be oriented axially with respect to the input shaft.

In one preferred configuration of the invention, the play among the pins can be eliminated possibly by gluing them into the holes of at least one of the two components—the flywheel or the crankshaft. As the pins can be appropriately force-fitted in the holes of the other component, the adhesive can equalize the manufacturing tolerances between the pins and the holes in the above-mentioned components.

Alternatively, the pins can also be designed so that they are radially flexible, e.g. as radially elastic pin bushings, and thus can compensate for any play among the pins.

Under this aspect of the invention, too, the flywheel and the output end can be axially fixed in relation to one another by gluing them to the essentially axial and/or radial joint surfaces. The pins can then preferably sit radially outside the essentially axial joint surfaces, and can appropriately extend through the radial joint surfaces, so that they can keep the shear stress relatively low.

It is apparent that the present invention can be used not only in clutch components with a one-piece flywheel, but also in clutches whose flywheel can form a so-called two-mass flywheel, preferably with two flywheel masses which can rotate relative to one another, and can be connected to one another in a rotationally elastic manner, one of which can be connected to the crankshaft and the other of which can carry the pressure plate unit.

One aspect of the invention resides broadly in a transmission system for a motor vehicle, the transmission system comprising: a transmission input shaft having a longitudinal axis; a flywheel disposed on the transmission input shaft; a clutch disc; the clutch disc comprising: a hub; the hub for permitting the clutch disc to move axially but not substantially rotatably along the input shaft; a clutch pressure plate for causing the clutch disc to engage and disengage with the flywheel; an engine crankshaft; one of the crankshaft and the flywheel having female fastening means, the other one of the crankshaft and the flywheel having male fastening means; the male fastening means comprising a cross section perpendicular to the longitudinal axis; male fastening means comprising a mating surface of revolution about the longitudinal axis; the cross section of the male fastening means comprising rounded dimensions perpendicular to and along the longitudinal axis; the female fastening means comprising a cross section perpendicular to the longitudinal axis; the female fastening means comprising a mating surface of revolution about the longitudinal axis; the cross section of the female fastening means comprising rounded dimensions perpendicular to and along the longitudinal axis; the rounded dimensions of the male fastening means being parallel to one another along and intersecting the longitudinal axis; the rounded dimensions of the female fastening means being parallel to one another along and intersecting the longitudinal axis; the rounded dimensions of the male fastening means being substantially similar to one another; the rounded dimensions of the female fastening means being substantially similar to one another; the mating surface of the male fastening means being configured to mate with the mating surface of the female fastening means; the mating surface of the male fastening means and the mating surface of the female fastening means being configured such that when pushed together upon application of a first predetermined force to make contact with one another, the mating surface of the female fastening means and the mating surface of the male fastening means remain in contact with one another for transmitting torque between the crankshaft and the flywheel, the mating surface of the female fastening means and the mating surface of the male fastening means being configured to be released from one another upon application of a second predetermined force.

Another aspect of the invention resides broadly in an arrangement for fastening a clutch to a crankshaft in a transmission of a motor vehicle comprising: a transmission input shaft having a longitudinal axis; a flywheel disposed on the transmission input shaft; a clutch disc, the clutch disc comprising a hub for permitting the clutch disc to move axially but not substantially rotatably along the transmission input shaft; a clutch pressure plate for causing the clutch disc to engage and disengage with the flywheel; an engine crankshaft; said arrangement comprising: one of the crankshaft and the flywheel having female fastening means, the other one of the crankshaft and the flywheel having male fastening means; the male fastening means comprising a cross section perpendicular to the longitudinal axis; the male fastening means comprising a mating surface of revolution about the longitudinal axis; the cross section of the male fastening means comprising rounded dimensions perpendicular to and along the longitudinal axis; the female fastening means comprising a cross section perpendicular to the longitudinal axis; the female fastening means comprising a mating surface of revolution about the longitudinal axis; the cross section of the female fastening means comprising rounded dimensions perpendicular to and along the longitudinal axis; the rounded dimensions of the male fastening means being parallel to one another along and intersecting the longitudinal axis; the rounded dimensions of the female fastening means being parallel to one another along and intersecting the longitudinal axis; the rounded dimensions of the male fastening means being substantially similar to one another; the rounded dimensions of the female fastening means being substantially similar to one another; the mating surface of the male fastening means being configured to mate with the mating surface of the female fastening means; the mating surface of the male fastening means and the mating surface of the female fastening means being configured such that when pushed together upon application of a first predetermined force to make contact with one another, the mating surface of the female fastening means and the mating surface of the male fastening means remain in contact with one another for transmitting torque between the crankshaft and the flywheel, the mating surface of the female fastening means and the mating surface of the male fastening means being configured to be released ,from one another upon application of a second predetermined force.

Yet another aspect of the invention resides broadly in a method of assembling a transmission system, the transmission system comprising: a transmission input shaft having a longitudinal axis; a flywheel disposed on the transmission input shaft; a clutch disc, the clutch disc comprising a hub, the hub for permitting the clutch disc to move axially but not substantially rotatably along the input shaft; a clutch pressure plate for causing the clutch disc to engage and disengage with the flywheel; an engine crankshaft; one of the crankshaft and the flywheel having female fastening means, the other one of the crankshaft and the flywheel having male fastening means; the male fastening means comprising a cross section perpendicular to the longitudinal axis; the male fastening means comprising a mating surface of revolution about the longitudinal axis; the cross section of the male fastening means comprising rounded dimensions perpendicular to and along the longitudinal axis; the female fastening means comprising a cross section perpendicular to the longitudinal axis; the female fastening means comprising a mating surface of revolution about the longitudinal axis; the cross section of the female fastening means comprising rounded dimensions perpendicular to and along the longitudinal axis; the rounded dimensions of the male fastening means being parallel to one another along and intersecting the longitudinal axis; the rounded dimensions of the female fastening means being parallel to one another along and intersecting the longitudinal axis; the rounded dimensions of the male fastening means being substantially similar to one another; the rounded dimensions of the female fastening means being substantially similar to one another; the mating surface of the male fastening means being configured to mate with the mating surface of the female fastening means; the mating surface of the male fastening means and the mating surface of the female fastening means being configured such that when pushed together upon application of a first predetermined force to make contact with one another, the mating surface of the female fastening means and the mating surface of the male fastening means remain in contact with one another for transmitting torque between the crankshaft and the flywheel, the mating surface of the female fastening means and the mating surface of the male fastening means being configured to be released from one another upon application of a second predetermined force; the method comprising the steps of: providing the flywheel; providing the clutch disc; providing the pressure plate; providing the engine crankshaft; assembling the flywheel, the clutch disc, the pressure plate and the engine crankshaft by mating the male and the female fastening means; applying the first predetermined pressure to the male fastening means and the female fastening means to assemble the flywheel onto the engine crankshaft.

BRIEF DESCRIPTION OF THE DRAWINGS

The invention is explained in greater detail below with reference to the embodiments illustrated in the accompanying drawings in which.

DESCRIPTION OF THE PREFERRED EMBODIMENT

Figures 1, 2:
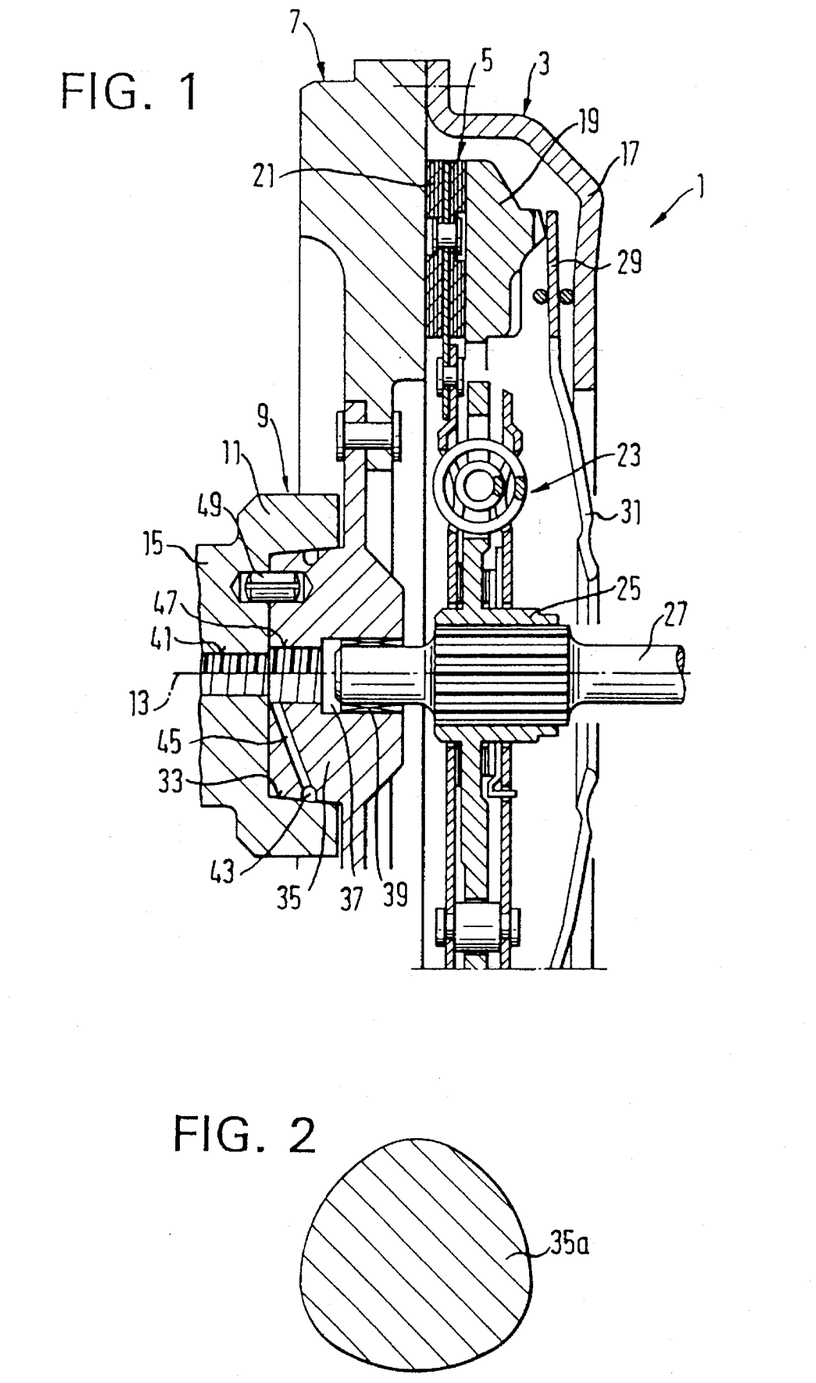
FIG. 1 shows a partial axial longitudinal section through a clutch component fastened to the output end of the crankshaft of an internal combustion engine of a motor vehicle.
FIG. 2 shows an axial cross section through the joint surface area of one variant of the clutch component.

FIG. 1 shows a motor vehicle friction clutch 1, the pressure plate unit of which friction clutch 1, designated 3 in general terms, can be combined with a clutch disc 5 and a flywheel 7 preferably into a clutch component. The clutch component can preferably be mounted as such by means of a fastening system 9, preferably on the output end 11 of a crankshaft 15, which crankshaft 15 can rotate around an axis of rotation 13, on an internal combustion engine of the motor vehicle. The clutch component can form a "modular clutch", in which "modular clutch" the pressure plate unit 3, the clutch disc 5, and the flywheel 7 can be combined into the clutch component, preferably before assembly on the output end 11 of the crankshaft 15, so that the entire clutch can be checked for its functional capability and compliance with specifications.

The pressure plate unit 3, in a manner which is well known in the art, can have a clutch housing 17 which clutch housing 17 can be fixed to the flywheel 7, for example by welding, so that the clutch housing 17 can be detached, but preferably does not detach during operation. An essentially disc-shaped application plate 19 can be mounted on the clutch housing 17. The application plate 19 can be mounted by means of tangential leaf springs, for example, which tangential leaf springs are not illustrated in any additional detail, but which tangential leaf springs may be disclosed in U.S. Pat. No. 4,757,597 to Kohler on Jul. 19, 1988, entitled "Method of Assembling a Friction Clutch", and U.S. Pat. No. 4,640,398 to Kolb et al. on Feb. 3, 1987, entitled "Friction Clutch with Tangential Leaf Springs". The application plate 19 can be mounted by means of tangential leaf springs so that the application plate 19 essentially does not rotate, but can preferably move axially.

Preferably between the application plate 19 and the flywheel 7, there can be friction linings 21 of the clutch disc 5, which friction linings 21 can be connected to a hub 25 of the clutch disc 5 in a manner well known in the art, such as by means of a torsional vibration damper 23, preferably in a rotationally elastic manner. The clutch disc 5 can be guided preferably by means of the hub 25 in an essentially non-rotating, but axially movable manner on an input shaft 27 of a transmission. The input shaft 27 can preferably be disposed downstream of the friction clutch 1 in the torque transmission path. A membrane spring 29, preferably held in the clutch housing 17, can apply pressure to the application plate 19, and the friction lining 21 can hold the application plate 19 in a friction-tight manner preferably against the flywheel 7. A disconnecting lever which disconnecting lever is not shown in any further detail, can act on flexible tongues 31 preferably of the membrane spring 29, whereby the load on the application plate 19 can be relieved and the clutch 1 can be disconnected or disengaged. Types of disconnecting or disengaging levers may be disclosed in U.S. Pat. No. 4,751,990 to Schraut et al. on Jun. 21, 1988, entitled "Multi-disc Clutch Unit, Particularly for Heavy Duty Motor Vehicles" and U.S. Pat. No 4,238,018 to Maucher on Dec. 9, 1980, entitled "Disengaging Unit for Drawing Disengagable Friction Clutches".

It should be apparent that the friction clutch 1 or friction clutch unit illustrated in FIG. 1 is only one example of a clutch unit which can be used in the context of the present invention. For example, the flywheel 7 can also be designed as a "two-mass" flywheel, and can be constructed of two flywheel masses which can rotate relative to one another around the axis of rotation 13. A first flywheel mass of the "two-mass" flywheel can be installed on the output end 11 of the crankshaft 15, preferably by means of the fastening device 9, while the second flywheel mass can carry the pressure plate unit 3. The two flywheel masses can preferably be coupled to one another in a rotationally elastic manner, preferably by means of a torsional vibration damper, not illustrated in any further detail here, but which torsional vibration damper may be disclosed in U.S. Pat. 4,782,936 to Bopp on Nov. 8, 1988, entitled "Two Mass Flywheel Assembly with Torsional Damping Means". The torsional vibration damper 23 can also be omitted in other embodiments.

The output end 11 of the crankshaft can preferably contain a central opening 33 in the face of the crankshaft 15, the inner jacket or surface of which opening 33 can form a taper surface which can taper axially into the crankshaft 15. A conical extension 35 which can project axially from the flywheel 7, can extend into the opening 33 in the end of the crankshaft 15, and the outer jacket of the conical extension 35 can have a taper surface which can essentially match the inner jacket of the opening 33 in the face of the crankshaft 15. The matching taper surfaces of the opening 33 and of the conical extension 35 can form the essentially axial joint surfaces of a radial interference fit, which can radially guide the flywheel 7 on the crankshaft 15, and can transmit the torque from the crankshaft 15 to the clutch 1. The taper of the joint surfaces of the opening 33 and of the conical extension 35 can preferably be be small enough that the taper surfaces can have self-locking properties preferably in the axial direction, so that there is essentially no need for an additional axial fixing of the flywheel 7 on the crankshaft 15.

The conical extension 35 can form a hub of the flywheel 7 and can contain a progressively stepped hole 37, which stepped hole 37 can expand radially toward the clutch disc 5. The stepped hole 37, preferably in its expanded portion, can house a pilot bearing 39, preferably for the radial guidance of the crankshaft-side end 15 of the transmission input shaft 27. The face or central opening 33 can continue or extend along the same axis as the stepped hole 37, preferably into a threaded hole 41, into which threaded hole 41 a clamping bolt (not shown) can be screwed through the hub 25, preferably for the assembly of the friction clutch 1, before the insertion of the transmission input shaft 27 into the hub 25. By means of the clamping bolt, which is not illustrated in any further detail and should be removed following assembly, the conical extension 35 can be axially pressed into the opening 33 in the end of the crankshaft 15. It should be apparent that other appropriate pressing tools can also be used, by means of which the conical extension 35 can be pressed through the hub 25 of the clutch disc 5 into the opening 33. These tools, for example, can be hydraulic presses or similar devices, which can be coupled to the output end 11 of the crankshaft 15 on one hand and to the flywheel 7 on the other hand, preferably by means of tie rod-compression sleeve connections.

The flywheel 7 can also be removed from the crankshaft 15 by means of hydraulically actuated extraction devices, which can preferably act by means of rod-sleeve connections through the hub 25 of the clutch disc 5 to the connection area 9. The conical extension 35 can be provided with threaded connections, for example, in the vicinity of its graduated or stepped hole 37. The extraction of the flywheel 7 from the output end 11 can also possibly be done by hydraulic expansion of the output end 11. For this purpose, there can preferably be a ring-shaped groove 43 on the circumference of the conical extension 35, which ring-shaped groove 43 can be connected by means of one or more radial channels 45, to a central pressure medium connection, e.g. designed as a threaded hole 47. The threaded hole 47 may form a part of the stepped hole 37. The pressure medium connection 47 can preferably be connected through the hub 25 of the clutch disc 5 to a hydraulic pressure unit 47a, shown in FIG. 1a, which hydraulic pressure 47a unit can hydraulically expand the opening 33 in the end of the crankshaft 15, preferably by means of the closed circular line or groove 43.

The joint surfaces formed by the opening 33 and the conical extension 35 can be joined to one another by means of adhesive, whereby the adhesive connection can not only increase the level of torque which can be transmitted and the axial self-locking of the fastening device or interference fit 9, but can also seal the joint surfaces to prevent any eventual frictional corrosion. Types of adhesives which could possibly be used in accordance with the present invention are linear polyesters, polyesteretheramide, polyetherester, polyamide, polyetherurethane, polyesteramide, nadimido-substituted cyclophosphazene derivatives, and olefin polymers with substituted maleamic acids (modified olefin polymers). During assembly, the adhesive, which has typically not yet hardened, can act as a lubricant, so that the axial pressing forces required during assembly can preferably be reduced. The flywheel 7 can be connected relative to the crankshaft 15 by means of an indexing pin 49, which indexing pin can define the angular position of the flywheel 7 relative to the crankshaft 15.

The indexing pin 49 may also serve to match up the joint surfaces of the extension 35 and the opening 33 so as to prevent any imbalance which may occur during operation.

The taper surfaces of the extension 35 and the opening 33 may be the self-releasing type of fastening or the self-locking type of fastening. Alternatively, the present invention may also feature characteristics of both self-locking and self-releasing types of fastenings. A self-releasing fastening may be a fastening in which the two pieces to be fastened can have essentially matching tapered surfaces, such as conical surfaces. These surfaces can then be forced together to essentially form a fastening which can be fixed or permanent until some type of pressure is applied to the fastening. This pressure may then cause the two fastened pieces to release from one another.

A self-locking fastening may be a fastening in which the two pieces to be fastened again have essentially matching tapered surfaces, such as conical surfaces. These surfaces surfaces can then be forced together to essentially form a permanent fastening which will most likely not readily release when pressure is applied.

In various other embodiments, the ranges of self-locking and self-releasing tapers may be different from those disclosed above, and, the values disclosed as self-locking values may be self-releasing values. Likewise, the values disclosed as self-releasing values may be self-locking values.

Further, the angular values listed above may be modified in accordance with the types and characteristics, such as surface characteristics, of materials used to make or form, such as turning on a lathe, casting, or to treat, such as heat treating, surface treating, tempering or hardening, the extension 35 and the opening 33.

Figure 1A:
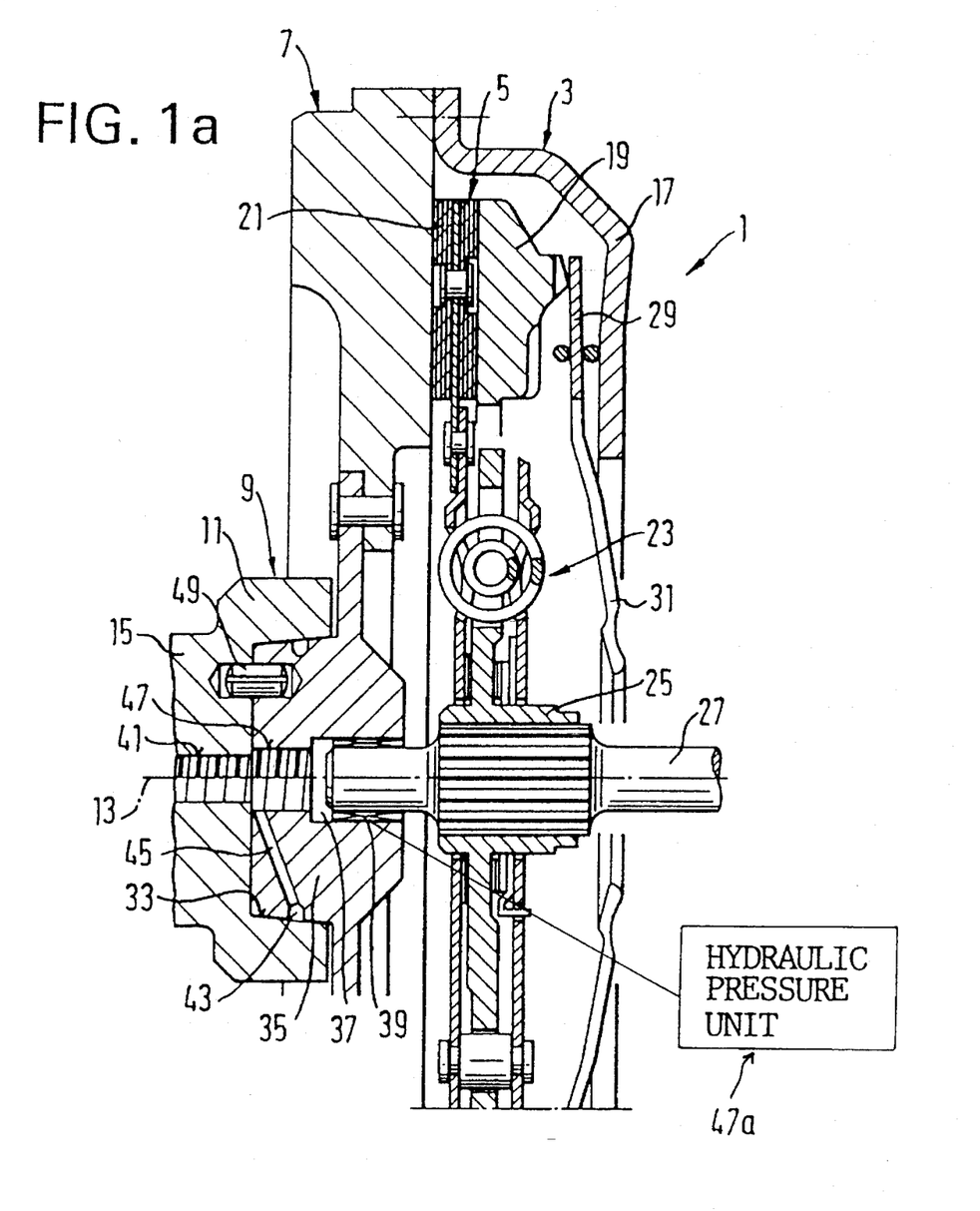
FIG. 1a shows substantially the same view as FIG. 1, but shows further detail.

Still further, in one embodiment the hydraulic pressure unit 47a, which hydraulic pressure unit 47a can hydraulically expand the opening 33 preferably by means of the groove 43, may be configured to produce an adequate pressure sufficient to release a self-releasing type of fastening, by expanding opening 33 such that extension 35 can be removed, as described above. However, in an alternative embodiment, the hydraulic pressure supplied by the hydraulic pressure unit 47a may be high enough to release a self-locking type of fastening, by expanding opening 33 such that extension 35 can be removed, as also described above.

Variants of the embodiment illustrated in FIG. 1 are explained further below. Components which perform the same functions are identified by the reference numbers used in FIG. 1, and have been assigned a letter to distinguish them. The general structure of the present invention and its operation are illustrated in FIG. 1.

In the embodiment illustrated in FIG. 1, the taper surfaces corresponding to one another of the face opening 33 and of the conical extension 35 can have circular cross sections. FIG. 2 illustrates one embodiment in which the conical extension 35a of the flywheel can have a substantially polygonal cross section. The face opening 33 can thus have a corresponding polygonal cross section even in the unassembled state. However, a circular cross section of the opening 33 can be made to match the polygonal cross section of the conical extension 35a, possibly by elastic deformation during axial fitting of the interference fit. In other possible embodiments, the cross sections of the extension 35 and the opening 33 could have other suitable configurations. Here, too, the joint surfaces corresponding to one another can be connected or fixed to one another by means of adhesive.

Figure 3:
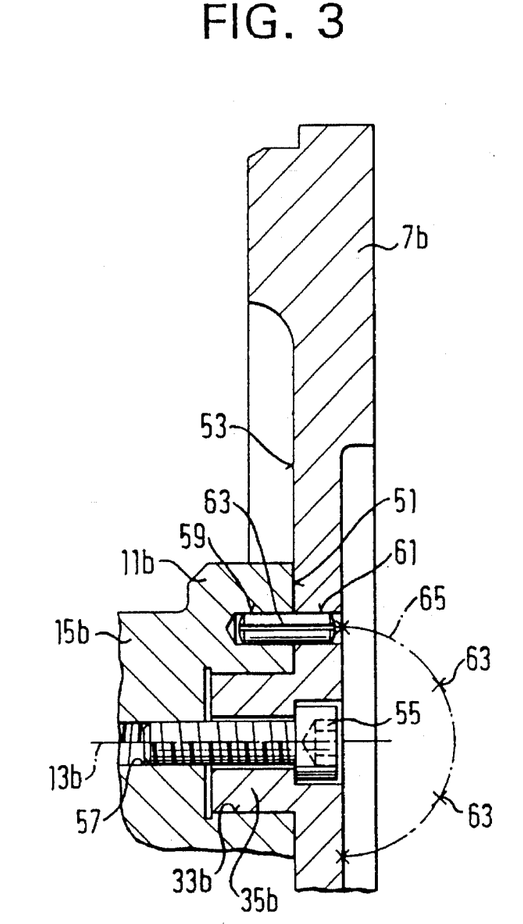
FIGS. 3 and 4 show axial longitudinal cross sections, through the joint surface area, of additional variants of the clutch fastening.

FIG. 3 illustrates an additional embodiment in which the flywheel 7b can be engaged by means of a substantially cylindrical extension 35b. The cylindrical extension 35b can be centered in relation to the axis of rotation 13b in a corresponding substantially cylindrical opening 33b, in the output end 11b of the crankshaft 15b. The cylindrical inside jacket of the opening 33b and the cylindrical outside jacket of the cylindrical extension 35b can form joint surfaces which can essentially match one another, and can radially center the flywheel 7b on the output end 11b. The output end 11b can have an end surface 51 which can run substantially perpendicular to the axis of rotation 13b, which end surface 51 can also be in contact with a surface 53 of the flywheel 7b. The surface 53 of the flywheel 7b can preferably be oriented substantially perpendicular to the axis of rotation 13b. The surfaces 51, 53 can form radial joint surfaces which can axially position the flywheel 7*b* relative to the output end 11*b*. The cylindrical joint surfaces of the opening 33*b* and of the cylindrical extension 35*b*, as well as the surfaces 51, 53, can preferably be glued together, whereby this adhesive connection can transmit the torque from the crankshaft 15*b* to the flywheel 7*b*. The radial joint surfaces 51, 53 thereby can run radially outside the cylindrical joint surfaces of the opening 33*b* and of the cylindrical extension 35*b*.

To increase the torque which can be transmitted between the cylindrical joint surfaces of the opening 33*b* and of the cylindrical extension 35*b*, the opening 33*b* and the cylindrical extension 35*b* can preferably be sized for a transition fit or for an interference fit. The adhesive connection can in turn serve to seal the surfaces of the joint and can prevent any frictional corrosion. During the assembly process, the adhesive can also act as a lubricant. A central clamping bolt 55 can be screwed through the cylindrical extension 35*b*, into a threaded hole 57 of the crankshaft 15*b*. The clamping bolt 55 can be removed, if necessary, after assembly.

As an alternative to the adhesive connection, but also possibly in addition to the adhesive connection, holes 59, 61, which holes 59, 61 can be axially aligned with respect to one another and substantially parallel to the axis of rotation 13*b*, can be made in the output end 11*b* on one hand, and radially elastic pin sleeves 63 can be inserted in the flywheel 7*b* on the other hand. The pin sleeves 63 can be located at some distance from one another, preferably on a circle 65 centered on the axis of rotation 13*b*. The pin sleeves 63 can provide compensation radially, and in the circumferential direction on account of their radially elastic characteristics. If the shear strength of the pin sleeves 63 has been appropriately selected, the major portion of the torque to be transmitted can be guided via the pin sleeves 63. The clamping bolt 55 can then be used primarily for axial securing, which can have the advantage that during the assembly of the flywheel 7*b*, essentially only comparatively low screw torques need to be applied. It should be apparent that the clamping bolt 55 can possibly be omitted if the axial securing is achieved by other measures, e.g. by adhesive connections between the joint surfaces of the opening 33*b* and of the extension 35*b*, or by an interference fit preferably of the cylindrical joint surfaces.

Figure 4:
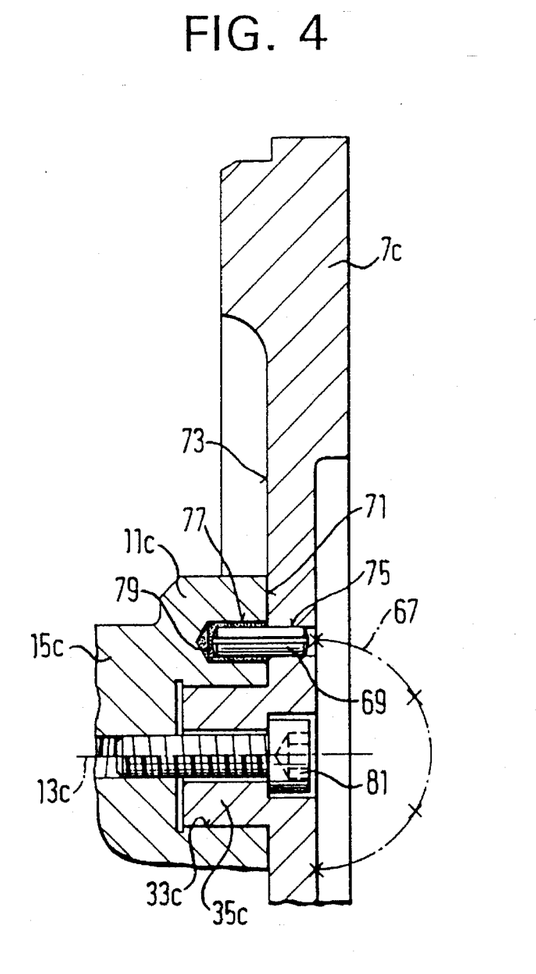

FIG. 4 shows an additional embodiment in which the torque transmission preferably from the output end 11*c* of the crankshaft 15*c* to the flywheel 7*c* can again be performed by means of numerous pins 69 preferably distributed over a concentric circle 67 around the axis of rotation 13*c*. The flywheel 7*c* can be engaged with a central cylindrical extension 35*c* in a likewise cylindrical opening 33*c*, preferably in the end surface of the output end 11*c* of the crankshaft 15*c*, where the flywheel 7*c* can be radially centered preferably by the cylindrical joint surfaces of the cylindrical opening 33*c* and the cylindrical extension 35*c*. Joint surface 71 which can run perpendicular to the axis 13*c* on the end of the crankshaft 15*c*, and joint surface 73 on the flywheel 7*c* can essentially guarantee the axial positioning of the flywheel 7*c* relative to the crankshaft 15*c*.

The pins 69 can be seated in an interference fit preferably in a hole 75 of one of the two components to be connected to one another in a non-rotating manner, here the flywheel 7*c*. The pins 69 can then extend axially parallel to the axis of rotation 13*c*, preferably through the radial joint surfaces 71, 73, preferably into holes 77 of the other component, here the crankshaft 15*c*, axially aligned for this purpose. The hole 77 can be sized for a force-fit, an interference fit, or for a transition fit, and the pins 69 can be glued into the holes 77 possibly to compensate for manufacturing tolerances, as indicated by the adhesive 79. The adhesive 79 in the vicinity of the pins 69 can provide a connection essentially without play between the crankshaft 15*c* and the flywheel 7*c*. It should be apparent that here, too, both the cylindrical joint surfaces of the cylindrical extension 35*c* and the cylindrical opening 33*c* and the radial joint surfaces of the cylindrical extension 35*c* and the cylindrical opening 33*c* can be glued to one another, on one hand to be able to transmit higher torques, and on the other hand to achieve an axial fixing. The axial fixing can be accomplished, if necessary, by the central clamping bolt indicated at 81. The cylindrical joint surfaces of the cylindrical extension 35*c* and of the opening 33*c* in the end of the crankshaft 15*c* can also be sized for an interference fit, possibly to increase the torque which can be transmitted.

All of the embodiments disclosed above may have further embodiments which have a force fit among the opening 33 and the extension 35.

Further, a transition fit may exist between a tapered receiving member, such as opening 33, and a cylindrical extending member, such as extension 35, wherein the cylindrical extending member, such as extension 35 would substantially conform to the tapers of the tapered receiving member, such as opening 33.

Still further, in accordance with the embodiments disclosed above, a first predetermined force should be sufficient to self-lock the opening 33 and the extension 35 together. This first predetermined force can be determined by experiment which does not require an undue number of attempts. Further, a second predetermined force should be sufficient to release the opening 33 and the extension 35 from one another. The first predetermined force may include a first force range, and the second predetermined force may include a second force range.

Figure 5:
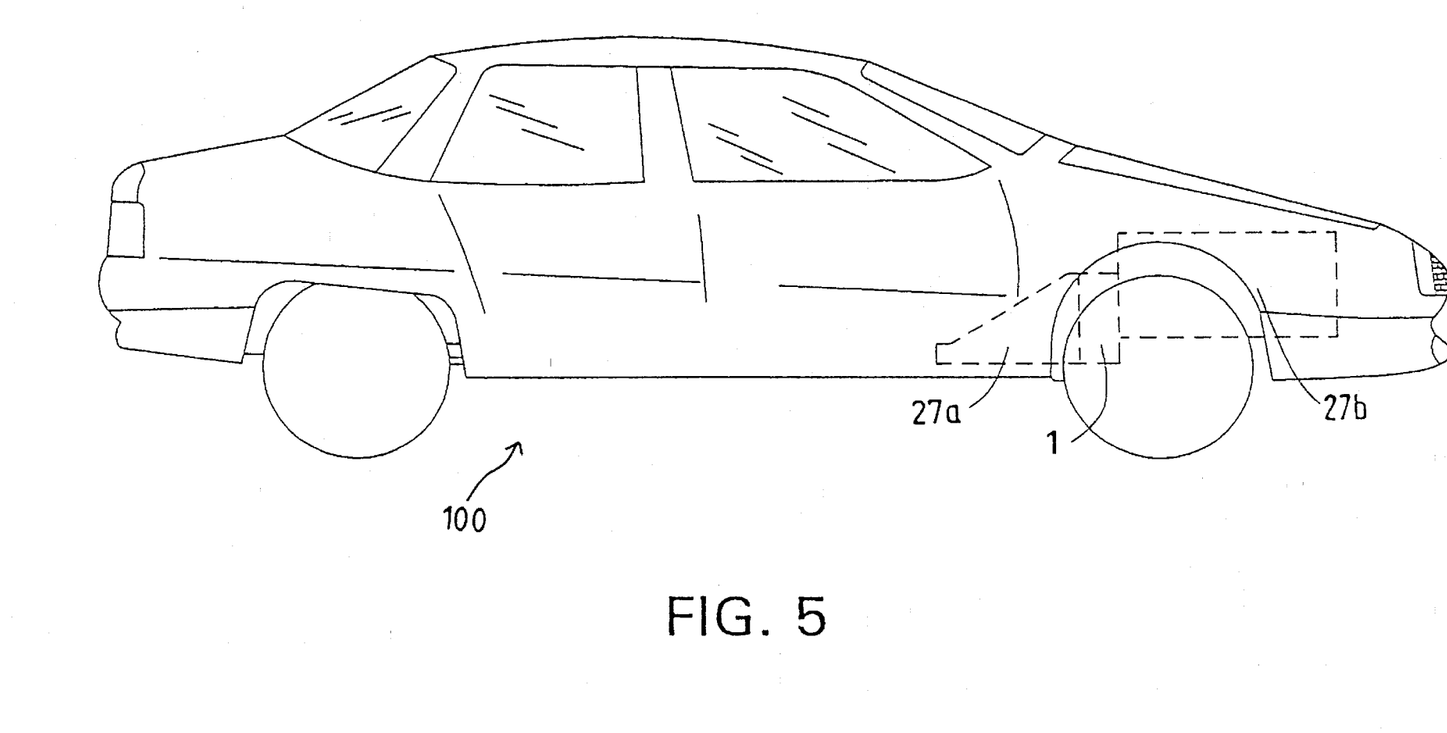
FIG. 5 shows a typical automobile which may incorporate the clutch component.

FIG. 5 shows what could be considered to be a typical automobile 100. Such an automobile could typically have an internal combustion engine 27*b* mounted in a forward portion thereof. Such an automobile could also typically include a drive shaft (not shown) and a transmission 27*a* for transmitting mechanical power to the wheels. Such an automobile could also typically include the friction clutch 1, for engaging the engine 27*b* with the transmission 27*a*.

In the embodiments described herein above, the flywheel can have a centric extension which can be engaged with an opening on the output end of the crankshaft. The centric extension can provide for a radial centering and can guide the flywheel on the crankshaft preferably without any substantial rocking or tipping. Alternatively, there can be other possible embodiments in which the crankshaft can have a cylindrical or conical extension which can be engaged in a centric opening of the flywheel, and here can radially center the flywheel by means of substantially axial joint surfaces.

One feature of the invention resides broadly in the system to fasten a flywheel 7 combined into a single component 1 with a clutch plate unit 3 and a clutch disc 5 on an output end 11 of a crankshaft 15 of an internal combustion engine, with essentially axial joint surfaces on the output end 11 on one hand, and on the flywheel 7 on the other hand, characterized by the fact that the joint surfaces are designed as taper surfaces which are self-locking in the axial direction.

Another feature of the invention resides broadly in the system characterized by the fact that the flywheel 7 is axially fixed in the axial direction exclusively by means of its taper surface on the output end 11.

Yet another feature of the invention resides broadly in the system characterized by the fact that the flywheel 7 has a conical extension 35 with a joint surface which tapers in a conical fashion toward the crankshaft 15, and is engaged by means of the conical extension 35 in a centric opening 33 in the end surface of the output end 11 of the crankshaft 1, forming a corresponding conical joint surface.

Still another feature of the invention resides broadly in the system characterized by the fact that the conical extension 35 has a continuous, centric, axial hole 37 and the opening 33 in the end surface makes the transition into a centric threaded hole 41 for a clamping bolt which is inserted through the hole 37 of the conical extension 35.

A further feature of the invention resides broadly in the system characterized by the fact that the clamping bolt can be extracted through the clutch component.

Another feature of the invention resides broadly in the system characterized by the fact that the taper surfaces can be connected to one another by means of adhesive.

Yet another feature of the invention resides broadly in the system characterized by the fact that at least one of the taper surfaces has at least one ring-shaped groove 43, which is connected by means of a passage to a pressure medium connection 47.

Still another feature of the invention resides broadly in the system characterized by the fact that at least one of the taper surfaces has a polygonal profile in axial cross section.

A further feature of the invention resides broadly in the system to fasten a flywheel 7b combined into a single component with a clutch plate unit 3 and a clutch disc 5 on an output end 11b of a crankshaft 15b of an internal combustion engine, with essentially axial joint surfaces on the drive end 11b on one hand, and on the flywheel 7b on the other hand, characterized by the fact that the flywheel 7b is connected by adhesive to the output end by means of the essentially axial joint surfaces and/or by means of the essentially radial joint surfaces 51, 53 of the flywheel 7b and of the output end 11b.

Another feature of the invention resides broadly in the system characterized by the fact that the essentially axial joint surfaces are formed by cylindrical surfaces.

Yet another feature of the invention resides broadly in the system characterized by the fact that the essentially axial joint surfaces are sized for a transition fit or an interference fit.

Still another feature of the invention resides broadly in the system characterized by the fact that the flywheel is centered by means of the essentially axial joint surfaces on the output end 11b of the crankshaft 15b.

A further feature of the invention resides broadly in the system characterized by the fact that the radial joint surfaces 51, 53 extend radially outside the essentially axial joint surfaces.

Another feature of the invention resides broadly in the system to fasten a flywheel 7b; 7c combined into a single component with a clutch plate unit 3 and a clutch disc 5 on an output end 11b; 11c of a crankshaft 15b; 15c of an internal combustion engine, with essentially axial and/or radial joint surfaces on the output end 11b; 11c on one hand, and on the flywheel 7b; 7c on the other hand, characterized by the fact that in numerous holes 59, 61; 75, 77 in the flywheel 7b; 7c and in the output end 11b; 11c distributed around the axis of rotation 13b; 13c of the crankshaft 15b; 15c and axially aligned with one another in pairs, there are pins 63; 69 for the transmission of torque without play.

Yet another feature of the invention resides broadly in the drive system characterized by the fact that the pins 63; 69 are designed as radially flexible pin sleeves.

Still another feature of the invention drive system characterized by the fact that the pins 69 are glued into the holes 75 of at least one 15c of the components 7c; 15c—the flywheel and/or the crankshaft.

A further feature of the invention resides broadly in the system characterized by the fact that the pins 69 are force-fitted into the holes 77 of the other component Another feature of the invention resides broadly in the system characterized by the fact that the flywheel 7b; 7c is axially fixed on the output end 11b; 11c by means of a centric bolt 55, 81.

Yet another feature of the invention resides broadly in the system characterized by the fact that the pins 63, 69 are located radially outside the essentially axial joint surfaces.

Still another feature of the invention resides broadly in the system characterized by the fact that the pins 63, 69 run through the radial joint surfaces 51, 53; 71, 73.

A further feature of the invention resides broadly in the system characterized by the fact that the flywheel 7b; 7c and the output end 11b; 11c are connected by means of adhesive to essentially axial and/or radial joint surfaces for axial fixing to one another.

Types of two-mass flywheels may be disclosed in the following U.S. Patents: U.S. Pat. No. 5,103,688 to Kuhne on Apr. 14, 1992, entitled "Two-mass Flywheel"; and U.S. Pat. No. 4,777,843 to Bopp on Oct. 18, 1988, entitled "Two-mass Flywheel Assembly with Viscous Damping Assembly".

Types of locking fastenings may be disclosed in the following U.S. Patents: U.S. Pat. No. 4,471,846 to Mullenbergon on Sep. 18, 1984, entitled "Clamping Arrangement"; U.S. Pat. No. 4,463,878 to Crone on Aug. 7, 1984, entitled "Cap Unit"; U.S. Pat. No. 4,712,810 to Pozzi on Dec. 15, 1987, entitled "Quick Action Self-locking Pipe Fittings"; U.S. Pat. No. 5,026,223 to Hunt on Jun. 25, 1991, entitled "Bayonet Tool Locking Device"; and U.S. Pat. No. 4,744,278 to Wright on May 17, 1988, entitled "Rotary Machining Tool and Method of its Manufacture".

Types of clutch assemblies may be disclosed in the following U.S. Patents: U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

The appended drawings in their entirety, including all dimensions, proportions and/or Shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The details in the patents, patent applications and publications incorporated herein by reference, form part of the specification, and are incorporable into the application during prosecution.

The invention as described hereinabove in the context of the preferred embodiments is not to be taken as limited to all of the provided details thereof, since modifications and variations thereof may be made without departing from the spirit and scope of the invention.

What is claimed is:

1. A transmission system for a motor vehicle, said transmission system comprising:

a transmission input shaft having a longitudinal axis and defining an axial direction parallel to said longitudinal axis;

a flywheel having means for being disposed on said transmission input shaft;

a clutch disc;

said clutch disc comprising:

a hub;

said hub for permitting said clutch disc to move axially but not substantially rotatably along said input shaft;

a clutch pressure plate for causing said clutch disc to engage and disengage with said flywheel;

means for transmitting torque from an engine of the motor vehicle to said flywheel;

one of said means for transmitting torque and said flywheel having female fastening means, the other one of said means for transmitting torque and said flywheel having male fastening means;

said male fastening means comprising:

a cross section substantially perpendicular to said longitudinal axis;

a circumferential mating surface disposed about said longitudinal axis;

said cross section of said male fastening means comprising a plurality of dimensions, each of said plurality of dimensions defining a plane perpendicular to said longitudinal axis;

said planes of said plurality of dimensions of said male fastening means being parallel to one another and intersecting said longitudinal axis;

each of said plurality of dimensions of said male fastening means being substantially similar to an adjacent one of said plurality of dimensions of said male fastening means;

said female fastening means comprising:

a cross section substantially perpendicular to said longitudinal axis;

a circumferential mating surface disposed about said longitudinal axis;

said cross section of said female fastening means comprising a plurality of dimensions, each of said plurality of dimensions defining a plane perpendicular to said longitudinal axis;

said planes of said plurality of dimensions of said female fastening means being parallel to one another and intersecting said longitudinal axis;

each of said plurality of dimensions of said female fastening means being substantially similar to an adjacent one of said plurality of dimensions of said female fastening means;

said circumferential mating surface of said male fastening means being configured to mate with said circumferential mating surface of said female fastening means;

said circumferential mating surface of said male fastening means and said circumferential mating surface of said female fastening means being configured such that when pushed together upon application of a first predetermined force to make contact with one another, said circumferential mating surface of said female fastening means and said circumferential mating surface of said male fastening means remain in contact with one another for transmitting torque between said means for transmitting torque and said flywheel, said circumferential mating surface of said female fastening means and said circumferential mating surface of said male fastening means being configured to be released from one another upon application of a second predetermined force;

said plurality of dimensions of said male fastening means together forming said circumferential mating surface of said male fastening means;

said plurality of dimensions of said female fastening means together forming said circumferential mating surface of said female fastening means;

said circumferential mating surface of said male fastening means comprising a plurality of diameters, one of said diameters of said male fastening means being a minimum diameter and one of said diameters of said male fastening means being a maximum diameter, the remaining ones of said plurality of diameters of said male fastening means being disposed between said minimum diameter and said maximum diameter;

each of said remaining ones of said plurality of diameters being greater than a preceding one of said diameters, to form a first tapered surface;

said circumferential mating surface of said female fastening means comprising a plurality of diameters, one of said diameters of said female fastening means being a minimum diameter and one of said diameters of said female fastening means being a maximum diameter, the remaining ones of said plurality of diameters of said female fastening means being disposed between said minimum diameter of said female fastening means and said maximum diameter of said female fastening means;

each of said remaining ones of said diameters of said female fastening means being greater than a preceding one of said diameters of said female fastening means, to form a second tapered surface;

said minimum diameter of said female fastening means for being disposed immediately adjacent said minimum diameter of said male fastening means;

said flywheel being fixed in the axial direction, upon application of said first predetermined force, solely by means of said contact between said first tapered surface and said second tapered surface.

2. The transmission system according to claim 1 wherein said means for transmitting torque comprises said female fastening means and said flywheel comprises said male fastening means.

3. The transmission system according to claim 2 wherein:

said male fastening means comprises a first surface portion extending substantially radially away from said longitudinal axis to said first tapered surface of said male fastening means;

said first tapered surface and said first surface portion together form a projection;

said female fastening means comprises a second surface portion extending substantially radially away from said longitudinal axis to said second tapered surface of said female fastening means;

said second tapered surface and said second surface portion together form an opening;

said minimum diameter of said male fastening means being disposed immediately adjacent said first surface portion;

said minimum diameter of said female fastening means being disposed immediately adjacent said second surface portion; and each of said diameters of said circumferential mating surface of said female fastening means are substantially similar to corresponding ones of said diameters of said circumferential mating surface of said male fastening means. means.

4. The transmission system according to claim 3 wherein:

said male fastening means further comprises:
 a third surface portion disposed adjacent the transmission input shaft and disposed at a substantial axial distance from said first surface portion;
 a first hole extending substantially from said first surface portion to said third surface portion, said first hole being disposed substantially concentrically about said longitudinal axis, the transmission input shaft being disposed in a portion of said first hole;

said second surface portion of said female fastening means comprises:
 a second hole being disposed substantially concentrically about said longitudinal axis and in substantial axial alignment with said first hole of said male fastening means; and said first hole and said second hole are configured for receiving bolt means, during assembly of said transmission system, wherein such bolt means are configured for positioning said male fastening means within said female fastening means.

5. The transmission system according to claim 4 wherein:

said means for transmitting torque comprises an engine crankshaft;

one of: said first tapered surface of said male fastening means and said second tapered surface of said female fastening means comprises at least one groove, said at least one groove being disposed to face towards the other one of: said first tapered surface and said second tapered surface;

said one of said male fastening means and said female fastening means comprising said at least one groove further comprises passage means for connecting said at least one groove portion to a means for providing pressure;

said female fastening means further comprises:
 a wall portion disposed substantially concentrically about said longitudinal axis and about said opening of said female fastening means, said wall portion comprising an interior portion and an exterior portion;
 said interior portion comprises said second tapered surface of said female fastening means;
 said exterior portion is disposed at a substantial radial distance from said interior portion;

said flywheel, said clutch disc and said clutch pressure plate comprise a single, preassembled unit;

said first tapered surface and said second tapered surface together comprise means for self-locking said male fastening means and said female fastening means to one another;

said flywheel is fixed in the axial direction by means of said contact between said first tapered surface and said second tapered surface and additionally by means of adhesive, the adhesive being disposed at least between said first tapered surface and said second tapered surface;

the bolt means for being received by said first and second hole comprises a clamping bolt;

said second hole of said female fastening means comprises:
 a threaded portion for engaging with said clamping bolt during assembly of said transmission system;

said first hole comprises:
 a threaded portion for engaging with said clamping bolt during assembly of said transmission system;

said hub of said clutch disc comprises means for receiving said input shaft;

said receiving means is disposed substantially concentrically about said longitudinal axis and is disposed in substantial axial alignment with said first hole of said male fastening means;

said receiving means comprises:
 means for permitting removal of the clamping bolt from said first hole and said second hole after assembly of said transmission system;

said first tapered surface of said male fastening means comprises said at least one groove;

said male fastening means comprises said passage means;

said transmission system further comprises:
 bearing means disposed within said portion of said first hole of said male fastening means wherein the transmission input shaft is disposed, said bearing means for positioning the transmission input shaft within said portion of said first hole of said male fastening means;
 a membrane spring for biasing said clutch pressure plate towards said flywheel;

said membrane spring comprising:
 a plurality of flexible tongues configured for releasing said clutch pressure plate from the biasing force of said membrane spring during disengagement of said clutch disc from said flywheel;
 housing means for housing at least said clutch disc, said clutch pressure plate, and said membrane spring;

said housing means being fastened to a portion of said flywheel;

said membrane spring is disposed between said housing means and said clutch pressure plate;

said clutch disc further comprises:
 friction lining means disposed between said clutch pressure plate and said flywheel;
 vibration damping means for attaching said friction lining means to said hub of said clutch disc;

said male fastening means further comprises:
 at least one blind hole disposed in said first surface portion and extending in a direction substantially parallel to said longitudinal axis;
 said at least one blind hole is disposed between said first hole of said male fastening means and said first tapered surface;

said female fastening means further comprises:
 at least one blind hole disposed in said second surface portion and extending in a direction substantially parallel to said longitudinal axis;
 said at least one blind hole of said female fastening means is disposed between said wall portion and said second hole of said female fastening means;
 said at least one blind hole of said female fastening means is disposed in substantial axial alignment with said at least one blind hole of said male fastening means;

said transmission system further comprises:
 at least one indexing pin disposed in at least a portion of said at least one blind hole of said male fastening means, and in at least a portion of said at least one blind hole of said female fastening means;

said at least one indexing pin is configured for defining an angular position of said flywheel with respect to said crankshaft, and for circumferentially positioning said male fastening means within said female fastening means;

said portion of said first hole in which the transmission input shaft is disposed is a first portion, said first portion having a diameter;

said first hole comprises a second portion disposed adjacent said first surface portion, said second portion having a diameter;

said diameter of said second portion is substantially less than said diameter of said first portion;

said second portion comprises said threaded portion of said first hole;

said means for providing pressure comprises a hydraulic pressure unit;

said receiving means comprises a third hole; and at least one of: said cross section of said male fastening means and said cross section of said female fastening means comprises a substantially polygonal portion disposed substantially perpendicular to said longitudinal axis.

6. A transmission system for a motor vehicle, said transmission system comprising:

a transmission input shaft having a longitudinal axis and defining an axial direction parallel to said longitudinal axis;

a flywheel having means for being disposed on said transmission input shaft;

a clutch disc;

said clutch disc comprising:
  a hub;
  said hub for permitting said clutch disc to move axially but not substantially rotatably along said input shaft;

a clutch pressure plate for causing said clutch disc to engage and disengage with said flywheel;

means for transmitting torque received from an engine of the motor vehicle to said flywheel;

said means for transmitting torque and said flywheel comprise at least one of a) and b):
  a) one of said means for transmitting torque and said flywheel comprising male fastening means, the other one of said means for transmitting torque and said flywheel comprising female fastening means;
    said male fastening means comprising an axial mating surface disposed about said longitudinal axis;
    said female fastening means comprising an axial mating surface disposed about said longitudinal axis;
    said axial mating surface of said male fastening means being disposed immediately adjacent said axial mating surface of said female fastening means;
    adhesive means disposed between said axial mating surface of said male fastening means and said axial mating surface of said female fastening means for transmitting a substantial portion of said torque between said means for transmitting torque and said flywheel; and
  b) said means for transmitting torque comprising a substantially radial surface disposed about, and perpendicular to, said longitudinal axis;
    said flywheel comprising a substantially radial surface disposed about, and perpendicular to, said longitudinal axis;
    said substantially radial surface of said means for transmitting torque being disposed immediately adjacent said substantially radial surface of said flywheel;
    adhesive means disposed between said substantially radial surface of said means for transmitting torque and said substantially radial surface of said flywheel for transmitting a substantial portion of said torque between said means for transmitting torque and said flywheel; and said substantially axial mating surface of said male fastening means comprising a rounded cylindrical shape, and said substantially axial mating surface of said female fastening means comprising a rounded cylindrical shape.

7. The transmission system according to claim 6 wherein:

said substantially radial surface of said male fastening means is a first radial surface;

said male fastening means further comprises:
  a second redial surface extending substantially from said longitudinal axis to said substantially axial mating surface of said male fastening means;
  said substantially axial mating surface of said male fastening means and said second radial surface together form a projection, said projection comprising said cylindrical shape;

said substantially radial surface of said female fastening means is a third radial surface;

said female fastening means further comprises:
  a fourth radial surface extending substantially from said longitudinal axis to said substantially axial mating surface of said female fastening means; and
  said substantially axial mating surface of said female fastening means and said fourth radial surface together form an opening, said opening comprising said cylindrical shape.

8. The transmission system according to claim 7 wherein said means for transmitting torque and said flywheel further comprise both a) and b).

9. The transmission system according to claim 8 wherein:

said projection comprises a diameter perpendicular to said longitudinal axis;

said opening comprises a diameter perpendicular to said longitudinal axis; and said diameter of said projection and said diameter of said opening are substantially similar such that, upon application of a predetermined force, said projection and said opening together comprise a force fit.

10. The transmission system according to claim 9 wherein:

said means for transmitting torque comprises an engine crankshaft; and said crankshaft comprises said female fastening means and said flywheel comprises said male fastening means.

11. The transmission system according to claim 10 wherein:

said transmission system further comprises:
  pin means;
  means for receiving said pin means, said receiving means being disposed in said flywheel and said means for transmitting torque, said pin means being disposed tightly in said receiving means;
  said pin means comprises a first portion and a second portion;
  said receiving means comprises:
    at least one hole disposed in said flywheel, said first portion of said pin means being disposed in said at least one hole of said flywheel;

at least one hole disposed in said means for transmitting torque, said at least one hole being disposed in substantial axial alignment with said at least one hole of said flywheel, said second portion of said pin means being disposed in said at least one hole of said means for transmitting torque;

at least one of the following sets of characteristics A) and B):

A) adhesive disposed in at least one of said at least one hole of said flywheel and said at least one hole of said means for transmitting torque, said pin means being configured to form a force fit with the other corresponding one of said at least one hole of said flywheel end said at least one hole of said means for transmitting torque; and B) said pin means comprises a pin sleeve, said pin sleeve being flexible in the radial direction;

said means for transmitting torque comprises an engine crankshaft;

said pin means comprises a plurality of pin means;

said at least one hole of said flywheel comprises a plurality of flywheel holes;

said at least one hole of said crankshaft comprises a plurality of crankshaft holes aligned with corresponding ones of said plurality of flywheel holes; and said plurality of flywheel holes and said plurality of crankshaft holes are disposed substantially concentrically about said longitudinal axis;

said plurality of flywheel holes are disposed in said first radial surface of said male fastening means;

said plurality of crankshaft holes are disposed in said third radial surface of said female fastening means;

said opening of said female fastening means is configured to center said male fastening means with respect to said longitudinal axis;

said projection comprises:
a base portion disposed at a substantial axial distance from said second radial surface;
said first radial surface extends radially outwardly from said base portion of said projection;

said opening comprises:
an end portion disposed at a substantial axial distance from said fourth radial surface;
said third radial surface extends radially outwardly from said end portion of said opening;

said male fastening means further comprises:
a surface portion disposed adjacent the transmission input shaft and disposed at a substantial axial distance from said first radial surface;
a first hole extending substantially from said surface portion to said first radial surface, said first hole being disposed substantially concentrically about said longitudinal axis, the transmission input shaft being disposed in a portion of said first hole;

said fourth radial surface of said female fastening means comprises:
a second hole disposed substantially concentrically about said longitudinal axis end in substantial axial alignment with said first hole of said male fastening means;

said first hole and said second hole are configured for receiving bolt means, during assembly of said transmission system, wherein such bolt means are configured for positioning said male fastening means within said female fastening means and for axially fixing said flywheel to said crankshaft;

said female fastening means comprises:
a wall portion disposed substantially concentrically about said longitudinal axis and about said opening, said wall portion comprising an interior portion and an exterior portion;
said exterior portion is disposed at a substantial radial distance from said interior portion;

the bolt means comprises a clamping bolt;

said second hole of said female fastening means comprises:
a threaded portion for engaging with said clamping said first hole of said male fastening means comprises:
a threaded portion for engaging with said clamping bolt;

said transmission system further comprises:
a membrane spring for biasing said clutch pressure plate towards said flywheel;

said membrane spring comprises:
a plurality of flexible tongues configured for releasing said clutch pressure plate from the biasing force of said membrane spring during disengagement of said clutch disc from said flywheel;
housing means for housing at least said clutch disc, said clutch pressure plate, and said membrane spring;
said housing means being fastened to a portion of said flywheel;
said membrane spring is disposed between said housing means and said clutch pressure plate;

said clutch disc further comprises:
friction lining means disposed between said clutch pressure plate and said flywheel;
vibration damping means for attaching said friction lining means to said hub of said clutch disc.

12. A transmission system for a motor vehicle, said transmission system comprising:

a transmission input shaft having a longitudinal axis and defining an axial direction parallel to said longitudinal axis;

a flywheel having means for being disposed on said transmission input shaft;

a clutch disc;

said clutch disc comprising:
a hub;
said hub for permitting said clutch disc to move axially but not substantially rotatably along said input shaft;

a clutch pressure plate for causing said clutch disc to engage and disengage with said flywheel;

means for transmitting torque received from an engine of the motor vehicle to said flywheel;

pin means for transmitting a substantial portion of said torque between said means for transmitting torque and said flywheel;

means for receiving said pin means, said receiving means being disposed in said flywheel and said means for transmitting torque;

said pin means comprising at least one cylindrical pin sleeve, each of said at least one pin sleeve being flexible in the radial direction and being disposed tightly in said receiving means;

each of said at least one pin sleeve comprising a first portion and a second portion;

said receiving means comprising:
at least one hole disposed in said flywheel, said first portion of each of said at least one pin sleeve being disposed in a corresponding one of said at least one hole of said flywheel; and at least one hole disposed in said means for transmitting torque, said at least one hole being disposed in substantial axial alignment with said at least one hole of said flywheel, said second portion of each of said at least one pin sleeve being disposed in a corresponding one of said at least one hole of said means for transmitting torque;

said transmission system further comprising adhesive disposed in at least one of:

each of said at least one hole of said flywheel and each of said at least one hole of said means for transmitting torque;

each of said at least one pin sleeve being configured to form a force fit with the other corresponding one of: said at least one hole of said flywheel and said at least one hole of said means for transmitting torque;

said means for transmitting torque comprising an engine crankshaft;

said at least one pin sleeve comprising a plurality of pin sleeves;

said at least one hole of said flywheel comprising a plurality of flywheel holes;

said at least one hole of said crankshaft comprising a plurality of crankshaft holes aligned with corresponding ones of said plurality of flywheel holes;

said plurality of flywheel holes and said plurality of crankshaft holes being disposed substantially concentrically about said longitudinal axis;

said means for transmitting torque and said flywheel comprising both of A) and B):

A) one of said means for transmitting torque and said flywheel comprising male fastening means, the other one of said means for transmitting torque and said flywheel comprising female fastening means;

said male fastening means comprising a substantially axial mating surface disposed about said longitudinal axis;

said female fastening means comprising a substantially axial mating surface disposed about said longitudinal axis;

said substantially axial mating surface of said male fastening means being disposed immediately adjacent said substantially axial mating surface of said female fastening means;

adhesive means disposed between said substantially axial mating surface of said male fastening means and said substantially axial mating surface of said female fastening means for transmitting a portion of said torque between said means for transmitting torque and said flywheel; and B) said means for transmitting torque comprising a substantially radial surface disposed about, and perpendicular to, said longitudinal axis;

said flywheel comprising a substantially radial surface disposed about, and perpendicular to, said longitudinal axis;

said substantially radial surface of said means for transmitting torque being disposed immediately adjacent said substantially radial surface of said flywheel;

adhesive means disposed between said substantially radial surface of said means for transmitting torque and said substantially radial surface of said flywheel for transmitting a portion of said torque between said means for transmitting torque and said flywheel;

said substantially axial mating surface of said male fastening means comprising a rounded cylindrical shape, and said substantially axial mating surface of said female fastening means comprising a rounded cylindrical shape;

said substantially radial surface of said male fastening means being a first radial surface;

said male fastening means further comprising:

a second radial surface extending substantially from said longitudinal axis to said substantially axial mating surface of said male fastening means;

said substantially axial mating surface of said male fastening means and said second radial surface together forming a projection, said projection comprising said cylindrical shape;

said substantially radial surface of said female fastening means being a third radial surface;

said female fastening means further comprising:

a fourth radial surface extending substantially from said longitudinal axis to said substantially axial mating surface of said female fastening means; and said substantially axial mating surface of said female fastening means and said fourth radial surface together forming an opening, said opening comprising said cylindrical shape;

said projection comprising a diameter perpendicular to said longitudinal axis;

said opening comprising a diameter perpendicular to said longitudinal axis;

said diameter of said projection and said diameter of said opening being substantially similar such that, upon application of a predetermined force, said projection and said opening together comprise a force fit;

said means for transmitting torque comprising an engine crankshaft;

said crankshaft comprising said female fastening means and said flywheel comprising said male fastening means;

said plurality of flywheel holes being disposed in said first radial surface of said male fastening means;

said plurality of crankshaft holes being disposed in said third radial surface of said female fastening means;

said opening of said female fastening means being configured to center said male fastening means with respect to said longitudinal axis;

said projection comprising:

a base portion disposed at a substantial axial distance from said second radial surface;

said first radial surface extending radially outwardly from said base portion of said projection;

said opening comprising:

an end portion disposed at a substantial axial distance from said fourth radial surface;

said third radial surface extending radially outwardly from said end portion of said opening;

said male fastening means further comprising:

a surface portion disposed adjacent the transmission input shaft and disposed at a substantial axial distance from said first radial surface;

a first hole extending substantially from said surface portion to said first radial surface, said first hole being disposed substantially concentrically about said longitudinal axis, the transmission input shaft being disposed in a portion of said first hole;

said fourth radial surface of said female fastening means comprising:
   a second hole disposed substantially concentrically about said longitudinal axis and in substantial axial alignment with said first hole of said male fastening means;
said first hole and said second hole being configured for receiving bolt means, during assembly of said transmission system, wherein such bolt means are configured for positioning said male fastening means within said female fastening means and for axially fixing said flywheel to said crankshaft;
said female fastening means comprising:
   a wall portion disposed substantially concentrically about said longitudinal axis and about said opening, said wall portion comprising an interior portion and an exterior portion;
   said exterior portion being disposed at a substantial radial distance from said interior portion; the bolt means comprising a clamping bolt;
said second hole of said female fastening means comprising:
   a threaded portion for engaging with said clamping bolt;
said first hole of said male fastening means comprising:
   a threaded portion for engaging with said clamping bolt;
said transmission system further comprising:
   a membrane spring for biasing said clutch pressure plate towards said flywheel;
said membrane spring comprising:
   a plurality of flexible tongues configured for releasing said clutch pressure plate from the biasing force of said membrane spring during disengagement of said clutch disc from said flywheel;
   housing means for housing at least said clutch disc, said clutch pressure plate, and said membrane spring;
   said housing means being fastened to a portion of said flywheel;
said membrane spring being disposed between said housing means and said clutch pressure plate;
said clutch disc further comprising:
   friction lining means disposed between said clutch pressure plate and said flywheel; and
   vibration damping means for attaching said friction lining means to said hub of said clutch disc.

\* \* \* \* \*

UNITED STATES PATENT AND TRADEMARK OFFICE
CERTIFICATE OF CORRECTION

PATENT NO. : 5,524,739  
DATED : June 11, 1996  
INVENTOR(S) : Wolfgang BAIER, Reinhart DEPPERT, Jens SCHNEIDER, Hilmar GÖBEL, Andreas GEBAUER, Alfred EUSEMANN, and Heiko SCHULZ-ANDRES It is certified that error appears in the above-indentified patent and that said Letters Patent is hereby corrected as shown below:

On the title page, item [57], line 1 under the "ABSTRACT" section, after 'system' insert --and a method--.

In column 12, line 25, after 'accordance', delete "With" and insert --with--.

In column 14, line 7, after 'component' insert --7c.--.

In column 14, lines 29-30, after 'to', delete "Mullenbergon" and insert --Mullenberg--.

In column 14, line 46, after 'and/or', delete "Shapes" and insert --shapes--.

In column 16, line 60, Claim 3, after 'tapered', delete "sur-face" and insert --surface--.

In column 17, line 5, Claim 3, after the first occurrence of 'means.' delete the second occurrence of "means."

In column 20, line 18, Claim 7, after 'second', delete "redial" and insert --radial--.

In column 21, line 14, Claim 11, after 'flywheel', delete "end" and insert --and--.

UNITED STATES PATENT AND TRADEMARK OFFICE
CERTIFICATE OF CORRECTION

PATENT NO. : 5,524,739
DATED : June 11, 1996
INVENTOR(S) : Wolfgang BAIER, Reinhart DEPPERT, Jens SCHNEIDER, Hilmar GÖBEL, Andreas GEBAUER, Alfred EUSEMANN, and Heiko SCHULZ-ANDRES It is certified that error appears in the above-indentified patent and that said Letters Patent is hereby corrected as shown below:

In column 22, line 11, Claim 11, after 'clamping' insert --bolt;--.

In column 24, line 21, Claim 12, after 'of', delete "said," and insert --said--.

Signed and Sealed this

Fourth Day of March, 1997

Attest:

BRUCE LEHMAN

Attesting Officer

Commissioner of Patents and Trademarks